United States Patent [19]

Akasaki et al.

[11] Patent Number: 4,889,924
[45] Date of Patent: Dec. 26, 1989

[54] BISAZO COMPOUNDS

[75] Inventors: Yutaka Akasaki; Akihiko Tokita; Kaoru Torikoshi; Akira Imai; Touru Ishii, all of Kanagawa, Japan

[73] Assignee: Fuji Xerox Co., Ltd., Tokyo, Japan

[21] Appl. No.: 103,875

[22] Filed: Oct. 2, 1987

[30] Foreign Application Priority Data

Oct. 2, 1986 [JP] Japan .................. 61-233274

[51] Int. Cl.$^4$ .................. C09B 35/34; G03G 5/04; G03G 5/06; H01L 31/08
[52] U.S. Cl. .................. 534/658; 534/561; 534/565; 534/581; 534/583; 534/587; 564/222
[58] Field of Search .................. 534/658

[56] References Cited

U.S. PATENT DOCUMENTS

| 4,390,608 | 6/1983 | Hashimoto et al. | 534/658 X |
| 4,481,271 | 11/1984 | Hashimoto et al. | 539/658 X |
| 4,618,672 | 10/1986 | Hashimoto | 534/658 |

FOREIGN PATENT DOCUMENTS

| 61-32064 | 2/1986 | Japan | 534/658 |
| 61-129653 | 6/1986 | Japan | 534/658 |
| 61-177462 | 8/1988 | Japan | 534/658 |

Primary Examiner—Floyd D. Higel
Attorney, Agent, or Firm—Sughrue, Mion, Zinn, Macpeak & Seas

[57] ABSTRACT

A bisazo compound having good electrophotographic properties is disclosed, which is represented by formula (I)

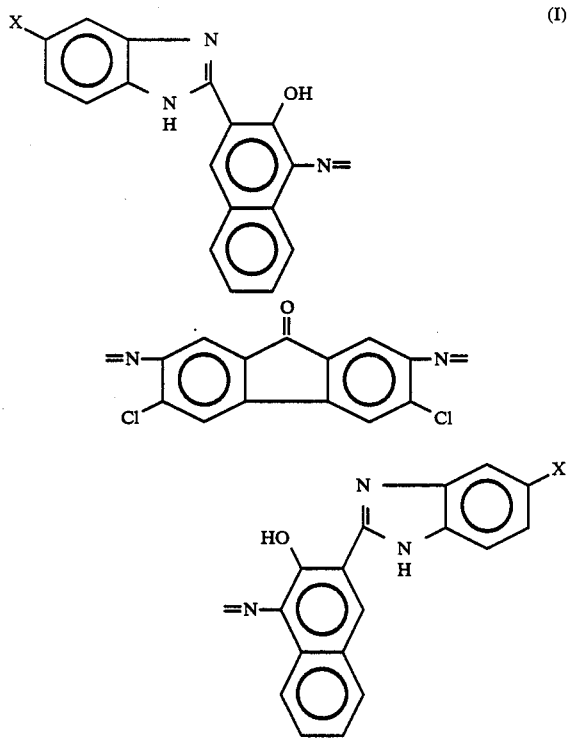

wherein X represents a hydrogen atom, a chlorine atom or a nitro group. A process for producing the bisazo compound is also disclosed.

4 Claims, 4 Drawing Sheets

BISAZO COMPOUNDS

CROSS-REFERENCE TO RELATED APPLICATION

This is a Continuation-in-part application of prior application Ser. No. 81509 filed Aug. 5, 1987 and now U.S. Pat. No. 4,820,600.

FIELD OF THE INVENTION

The present invention relates to novel bisazo compounds and a process for producing the same.

BACKGROUND OF THE INVENTION

Various organic compounds have been proposed for use as light-sensitive materials in photoreceptors for electrophotography, such as bisazo compounds described in Japanese Patent Application (OPI) Nos. 189759/85, 129653/86, and 221751/86 (the term "OPI" as used herein means an "unexamined published Japanese patent application"). However, electrophotographic properties of these bisazo compounds are not satisfactory.

SUMMARY OF THE INVENTION

An object of the present invention is to provide novel bisazo compounds having excellent electrophotographic properties.

Another object of the present invention is to provide a process for producing the novel bisazo compounds.

As a result of extensive study on various azo compounds, it has now been found that specific bisazo compounds possess superior electrophotographic properties. The present invention has been accomplished on the basis of this finding.

That is, the present invention involves novel bisazo compounds represented by formula (I)

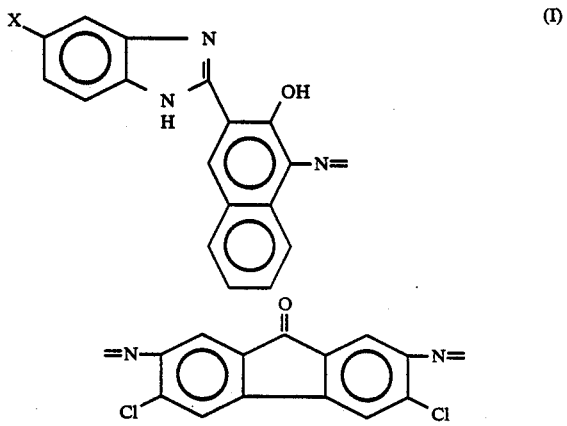

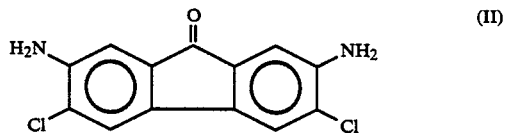

wherein X represents a hydrogen atom, a chlorine atom or a nitro group.

The novel bisazo compounds can be produced by diazotizing the amino groups of 3,6-dichloro-2,7-diaminofluorenone having the structural formula (II)

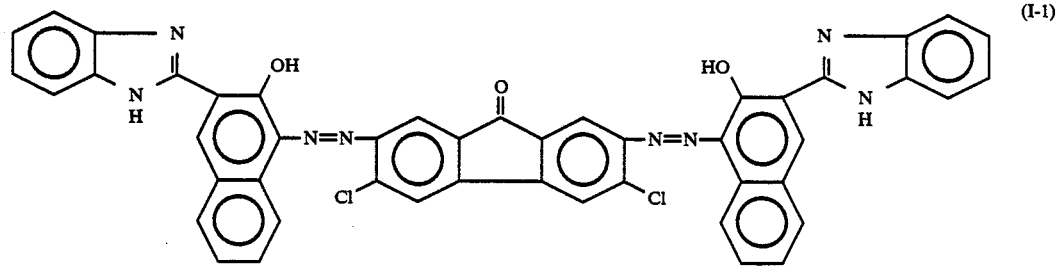

and reacting the resulting diazo compound with a coupler represented by formula (III)

wherein X has the same meaning as defined above.

DETAILED DESCRIPTION OF THE INVENTION

Figure 1:
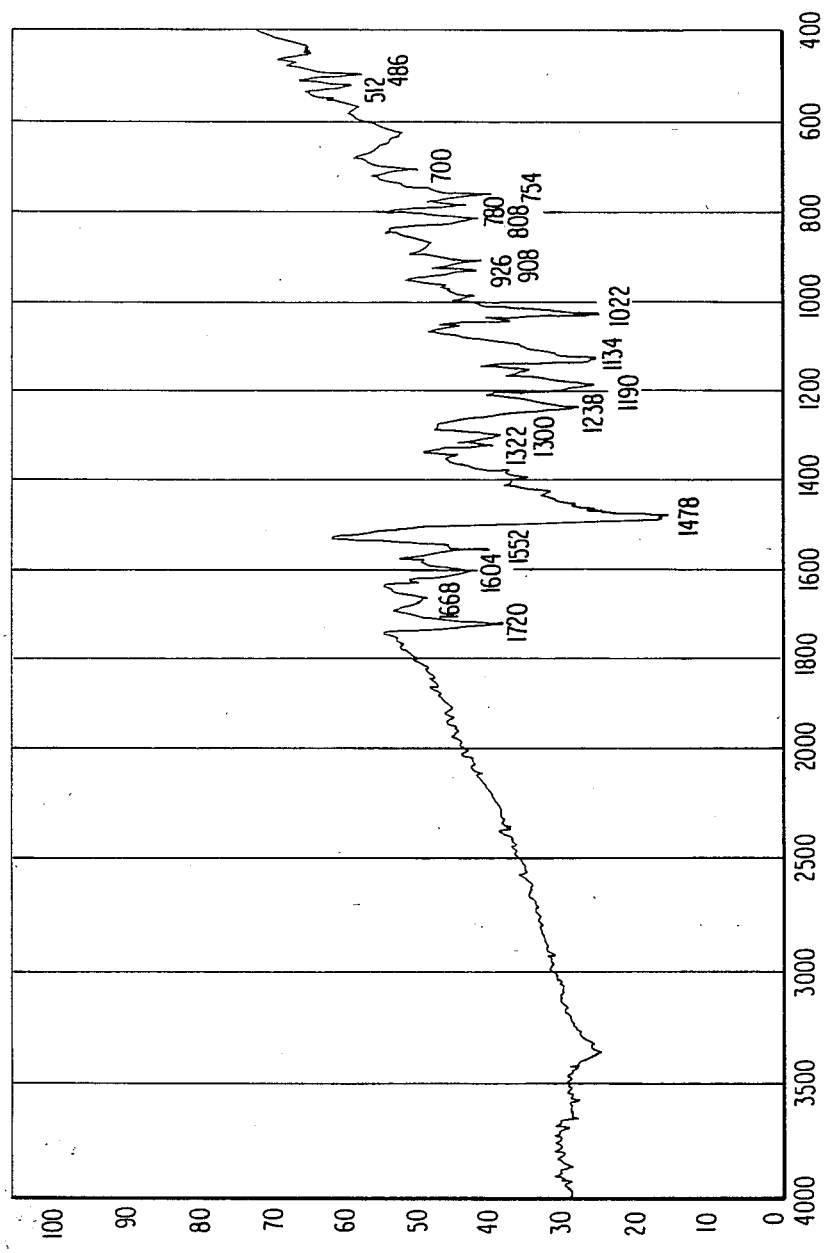
FIGS. 1, 2 and 3 are IR absorption spectra (KBr tab.) of the bisazo compounds prepared in Examples 1, 2 and 3, respectively, according to the present invention.

The 3,6-dichloro-2,7-diaminofluorenone having the structural formula (II) which is used as the starting compounds for the preparation of the novel compound of the present invention can be prepared by first acetylating 2,7-diaminofluorenone, then chlorinating the acetylated compound to obtain N,N'-(3,6-dichloro-9-oxo-2,7-fluorenylene)bisacetamine, and finally hydrolyzing the bisacetamide. The acetylation and chlorination can be carried out in a conventional manner, as described, for example, in A. Barker and C. C. Baker, J. Chem. Soc., 870 (1954) and H. Pan and T. L. Fletcher, J. Med. Chem., 7, 31 (1964), respectively. For instance, the acetylation can be performed by heating 2,7- diaminofluorenone in a mixture of acetic acid and acetic anhydride with stirring, and the chlorination can be performed by dispersing the acetylated compound in acetic acid and adding dropwise to the dispersion acetic acid having chlorine gas dissolved therein in the presence of ferric chloride as a catalyst. Further, the hydrolysis can be carried out in a conventional manner, for example, by dispersing the chlorinated product in water, adding conc. sulfuric acid gradually to the dispersion, followed by heating at 100° C. with stirring.

The coupler represented by formula (III) can be synthesized by any suitable method that is disclosed in the literature, such as Kohji Matsui and Toshio Kuroda, *Kogyo Kagaku Zasshi*, vol. 70, 2325 (1967).

Diazotization of the amino groups of 3,6-dichloro-2,7-diaminofluorenone can be performed, for example, by adding a nitrite such as sodium nitrite in an inorganic acid (e.g., hydrochloric acid, sulfuric acid, etc.) containing the fluorenone compound at a temperature in the range of −10° C. to 25° C. and preferably −10° C. to 5° C. The diazotization is usually completed within a period ranging from 3 minutes to 3 hours and preferably from 5 to 30 minutes. The inorganic acid is generally used in an amount of more than 5 mol per mols of the fluorenone compound, and hydrochloric acid (6N) is preferably used in an amount of from 50 to 70 ml per g of the fluorenone compound for diazotization. If desired, the diazotized product can be isolated in the form of a tetrazonium salt by adding an excess amount (preferably about 10 mols per mol of the diazotized product) of an aqueous solution of borofluoric acid or sodium borofluoride to the reaction solution so as to isolate a tetrazonium salt of 3,6-dichloro-2,7-diaminofluorenone, such as 2,7-bis(diazonio)-3,6-dichlorofluorenone tetrafluoroborate.

The reaction (diazotization) solution or the tetrazonium salt of 3,6-dichloro-2,7-diaminofluorenone may also be obtained by directly diazotizing N,N'-(3,6-dichloro-9-oxo-2,7-fluorenylene)bisacetamide which is a precursor of 3,6-dichloro-2,7-diaminofluorenone.

The reaction solution obtained by the diazotization of 3,6-dichloro-2,7-diaminofluorenone, or the isolated tetrazonium salt of 3,6-dichloro-2,7-diaminofluorenone, is subjected to a coupling reaction with the coupler of formula (III). The coupler is used in an amount of at least 2 mols, preferably from 2 to 3 mols, per mol of the diazotized product or its tetrazonium salt. This coupling reaction can be performed by any of the methods well known in the art. For instance, the isolated tetrazonium salt and the coupler are dissolved in an organic solvent (e.g., N,N'-dimethylformamide, dimethylacetamide, hexamethylphosphoramide, dimethyl sulfoxide, tetrahydrofuran, acetonitrile, acetone, etc.), and an alkali (aqueous) solution is added dropwise to the resulting solution at a temperature in the range of −50° C. to 40° C. Example of the alkali include NaOH, KOH, Na$_2$CO$_3$, K$_2$CO$_3$, NaHCO$_3$, Na$_2$HPO$_4$, sodium acetate, organic bases such as tertiary aliphatic amines (e.g., triethylamine and tributylamine) and pyridine, etc. When N,N'-dimethylformamide is used as a solvent, the temperature is generally from −50° C. to 20° C. and preferably from −50° C. to −10° C. In this case, NaOH and KOH are not preferably added as an alkali.

The present invention is now illustrated in greater detail by way of the following examples, but it should be understood that the present invention is not deemed to be limited thereto. In these examples, all the parts are by weight unless otherwise indicated.

EXAMPLE 1

Figure 4:
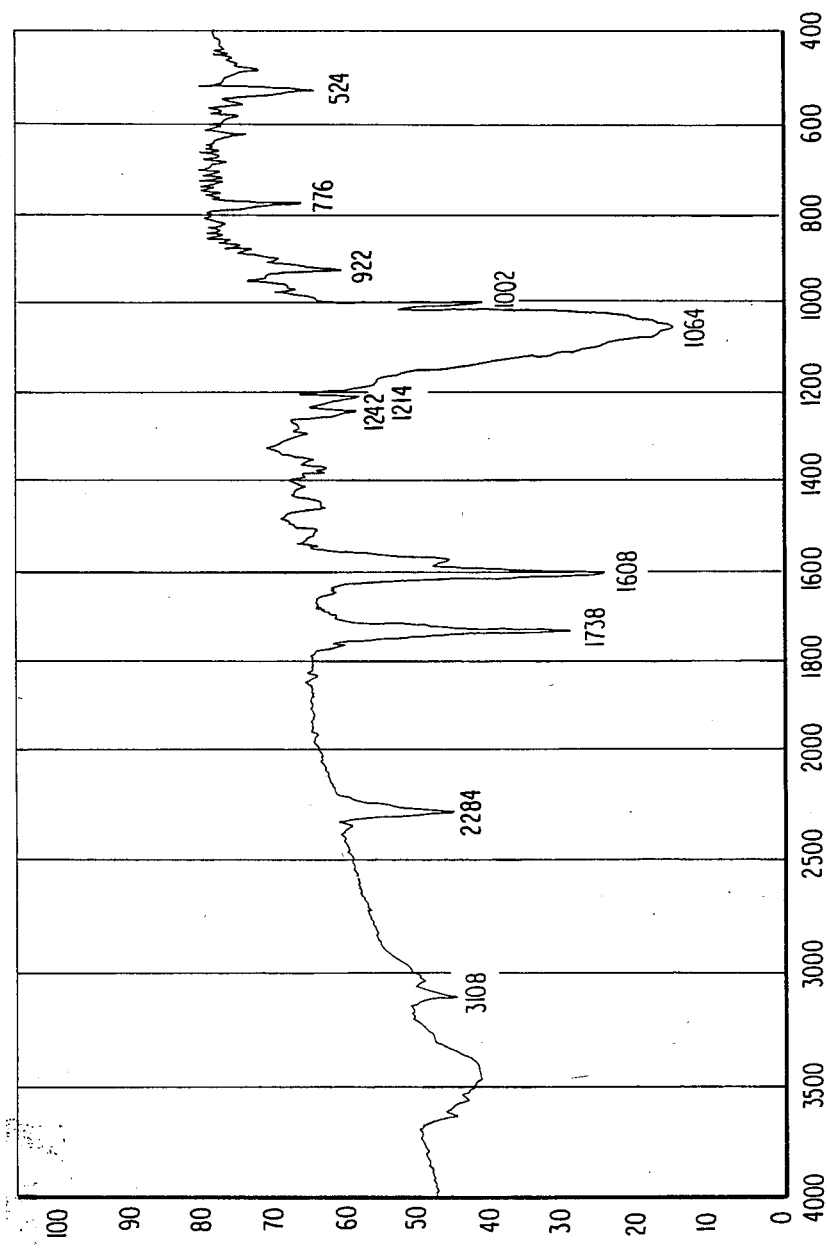
FIG. 4 is an IR absorption spectrum (KBr tab.) of 2,7-bis(diazonio)-3,6-dichlorofluorenone tetrafluoroborate used as the intermediate for the preparation of the compounds of the present invention.

2.79 g (10 mmol) of 3,6-dichloro-2,7-diaminofluorenone was dispersed in 50 ml of 6N HCl. While the dispersion was agitated under cooling with ice at 0° to 5° C., 1.52 g (22 mmol) of sodium nitrite in 10 ml of water was slowly added dropwise. After continued stirring for 30 minutes under cooling with ice, the reaction solution was freed of the insoluble matter by filtration. To the residue, 10 ml of 42% borofluoric acid was added and the resulting precipitate was separated by filtration, washed with water and dried to obtain 4.29 g (yield 90%) of 2,7-bis(diazonio)-3,6-dichlorofluorenone tetrafluoroborate. The IR absorption spectum of this compound as measured by the KBr tablet method is shown in FIG. 4.

1.30 g (5 mmol) of 3-(2'-benzimidazolyl)-2-naphthol was dissolved in 50 ml of dimethylformamide. After cooling the resulting solution at 0° to 5° C., 0.95 g (2 mmol) of the previously obtained tetrazonium salt was added. To the resulting solution, 0.68 g (5 mmol) of sodium acetate (trihydrate) in 10 ml of water was slowly added dropwise. Following continued stirring for 2 hours at room temperature, the solid was separated from the reaction mixture, repeatedly washed with dimethylformamide, then washed with water, and finally dried to obtain 1.41 g of (yield 86%) of a bisazo compound having the following structural formula (I-1). m.p.>350° C.

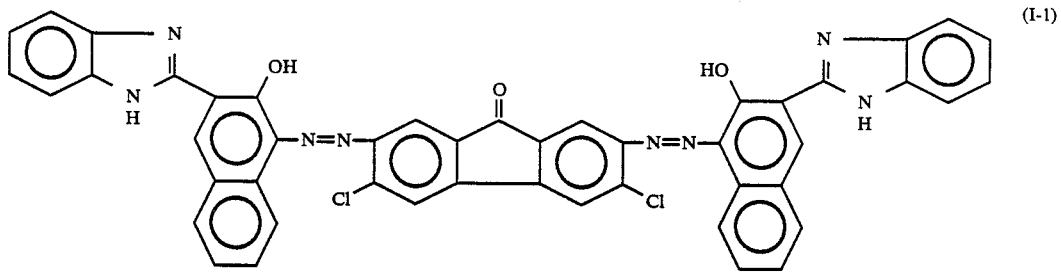

3,6-dichloro-2,7-diaminofluorenone, or the isolated tetrazonium salt of 3,6-dichloro-2,7-diaminofluorenone, is An IR absorption spectrum of this bisazo compound as measured by the KBr tablet method is shown in FIG. 1. The results of an elemental analysis conducted for this compound are shown below:

|  | C (%) | H (%) | N (%) |
| --- | --- | --- | --- |
| Calculated: | 68.70 | 3.19 | 13.64 |
| Found: | 68.33 | 3.31 | 13.47 |

EXAMPLE 2

The same procedure as in Example 1 was repeated, except that 3-(5'-chloro-2'-benzimidazolyl)-2-naphthol was used as a coupler. A bisazo compound represented by the following structural formula (I-2) was obtained in an amount of 1.55 g (yield 87%). m.p.>350° C.

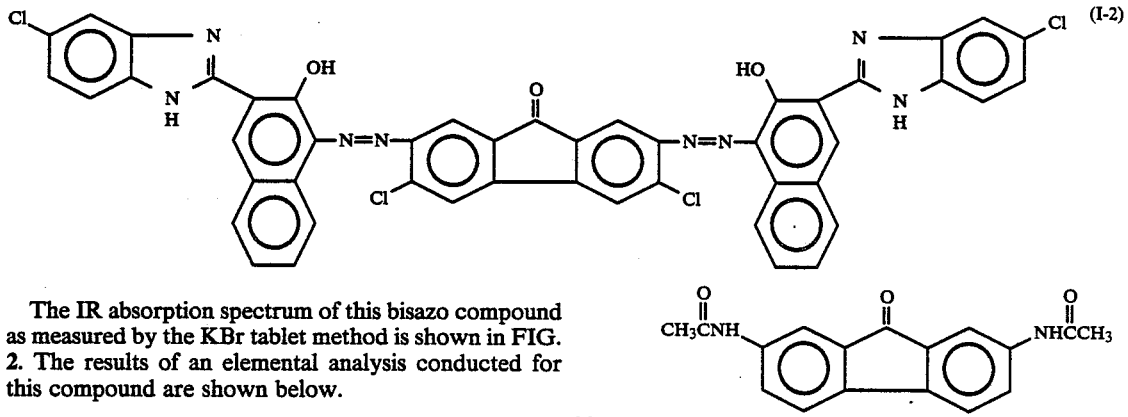

Figure 2:
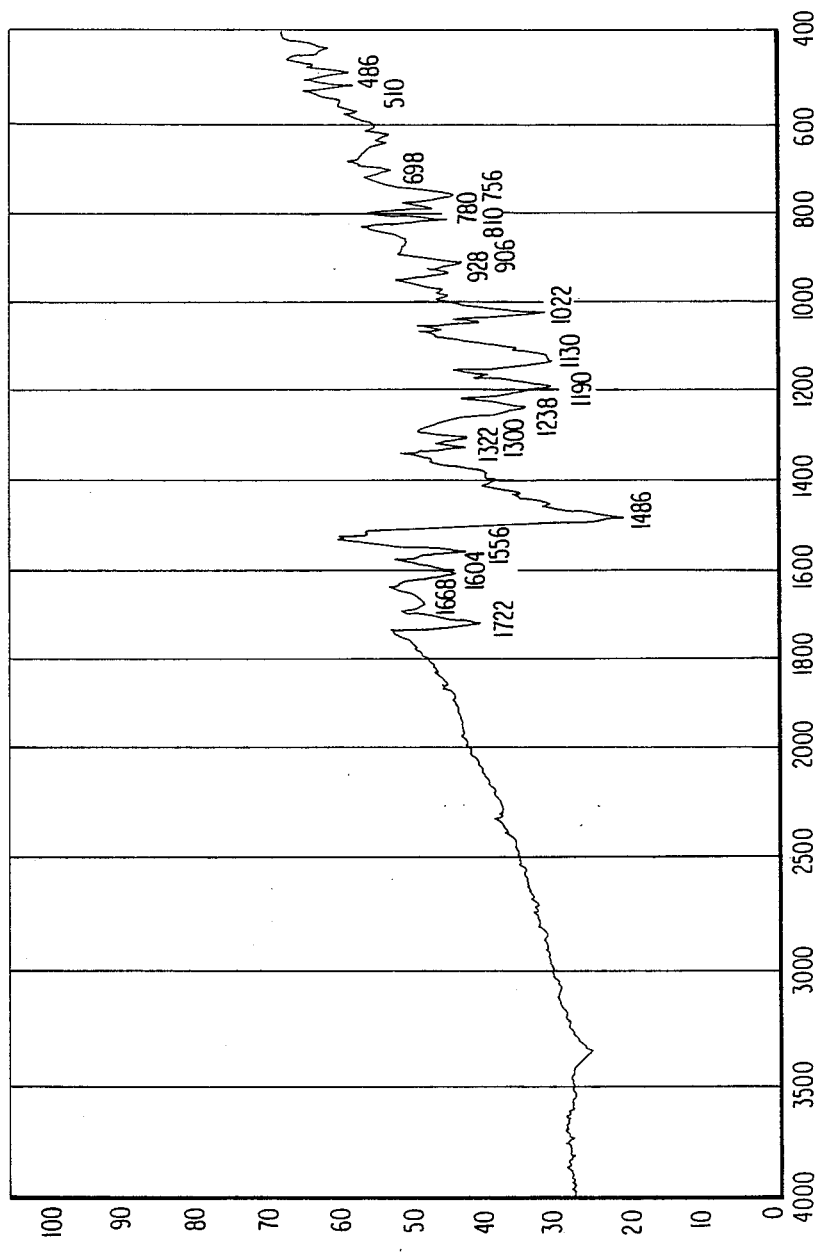

The IR absorption spectrum of this bisazo compound as measured by the KBr tablet method is shown in FIG. 2. The results of an elemental analysis conducted for this compound are shown below.

|  | C (%) | H (%) | N (%) |
|---|---|---|---|
| Calculated: | 63.39 | 2.72 | 12.58 |
| Found: | 63.14 | 2.66 | 12.48 |

EXAMPLE 3

The same procedure as in Example 1 was repeated, except that 3-(5'-nitro-2'-benzimidazolyl)-2-naphthol was used as a coupler. A bisazo compound represented by the following structural formula (I-3) was obtained in an amount of 1.39 g (yield 76%). m.p.>350° C.

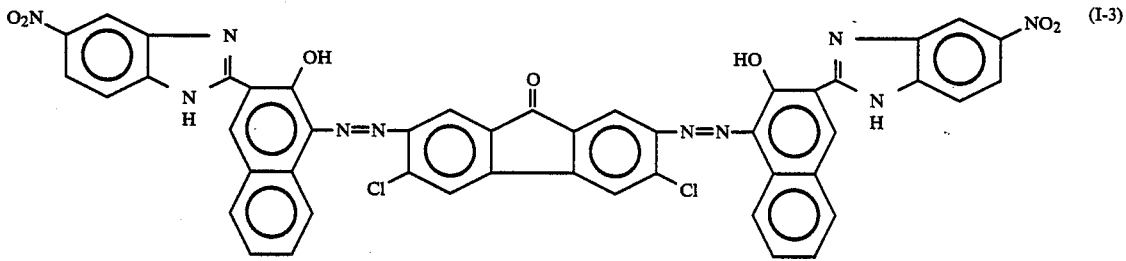

Figure 3:
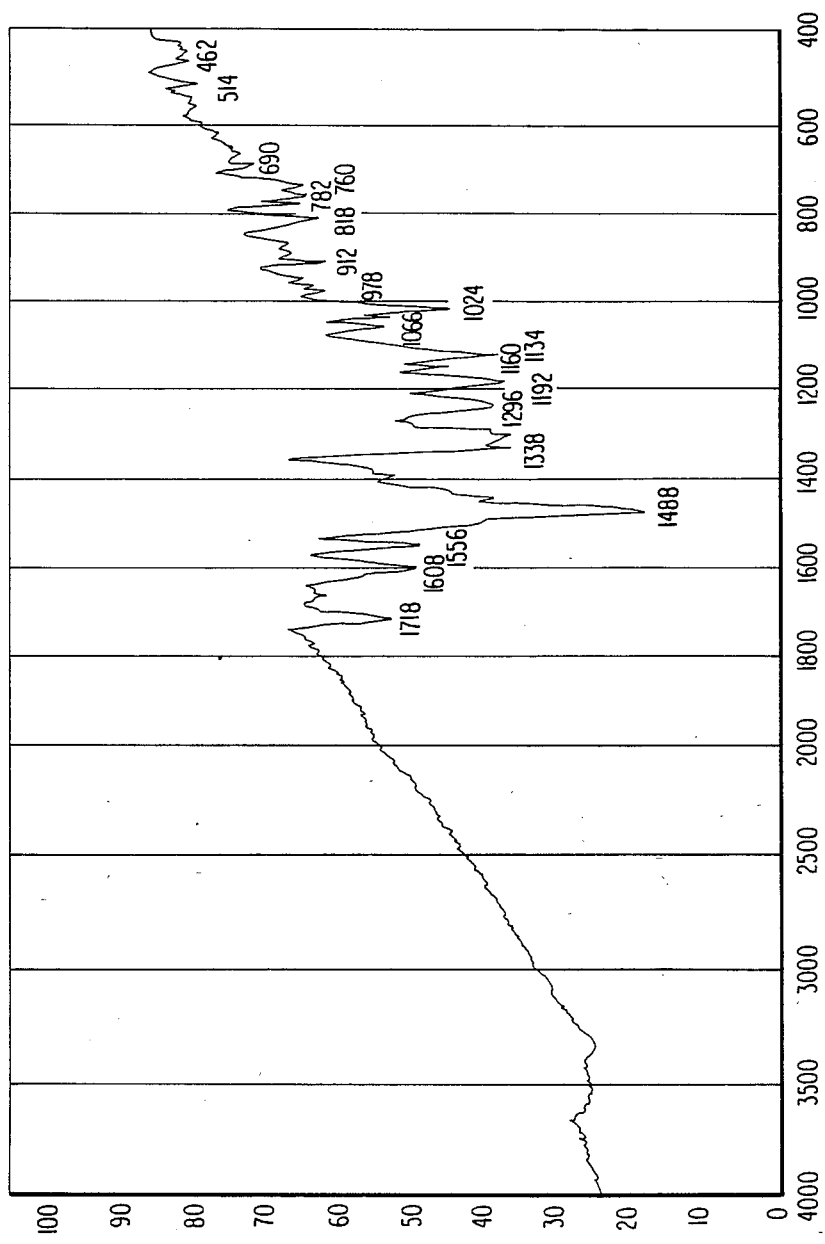

The IR absorption spectrum of this bisazo compound as measured by the KBr tablet method is shown in FIG. 3. The results of an elemental analysis conducted for this compound are shown below.

|  | C (%) | H (%) | N (%) |
|---|---|---|---|
| Calculated: | 61.92 | 2.65 | 15.36 |
| Found: | 61.60 | 2.73 | 15.19 |

PREFERENCE EXAMPLE 1

Preparation of 3,6-Dichloro-2,7-diaminofluorenone 0.239 mol of 2,7-diaminofluorenone was dispersed in 300 ml of acetic acid, to which 300 ml of acetic anhydride was then added with stirring at room temperature. After heating the resulting mixture under reflux for 2.5 hours, the reaction mixture was allowed to stand to cool and filtered to obtain crystals. The crystals were then washed with acetic acid, water, methanol, and ether, successively, followed by drying under vacuum, whereby 62.9 g (yield 90%) of reddish-orange crystals having the following structural formula. m.p.=350° to 352° C.

20.73 g (0.0704 mol) of the thus obtained acetylated product and 0.40 g of FeCl₃ were dispersed in 1 l of acetic acid, and 200 ml of acetic acid containing 11.8 g (0.166 mol) of chlorine was dropwise added to the dispersion over a period of 20 minutes in a dark room while stirring and heating at 50° C. The mixture was further stirred for 17 hours at 50° C. and then allowed to stand to cool. Crystals thus precipitated were separated by filtration and washed with acetic acid, water, and methanol, successively, to obtain about 21 g of crude products. The crude products were dissolved in 200 ml of dimethylformamide with heating and recrystallized three times to obtain 2.15 g of yellow needle-like crystals having the following structural formula.

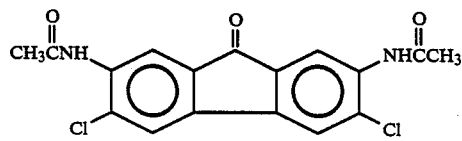

2.0 g (5.5 mmol) of the chlorinated product was added to 15 ml of water, to which 25 ml of conc. H₂SO₄ was gradually added with stirring and cooling on a water bath. The resulting yellow solution was then stirred for 1 hour at 100° C. After allowing to stand to cool, the solution was poured into about 200 ml of ice water, and crystals thus precipitated were filtered, washed with water, a 5% aqueous solution of potassium carbonate, water, and ethanol, successively, and dried under reduced pressure to obtain 1.49 g (yield 97%) of gray powder, 3,6-dichloro-2,7-diaminofluorenone. m.p.>340° C. (decomp.)

REFERENCE EXAMPLE 2

One part of a polyvinyl butyral resin ("BLX" produced by Sekisui Chemical Co., Ltd.) was dissolved in 40 parts of cyclohexanone, and the solution was mixed with 3 parts of the bisazo compound of formula (I-1). The resulting mixture was throughly dispersed in a paint shaker, and the dispersion was coated on an aluminum sheet using an applicator and dried to form a charge generating layer having a dry thickness of 0.2 μm.

A uniform solution consisting of 1 part of N,N'-diphenyl-N,N'-bis(3-methylphenyl)-[1,1'-biphenyl]-4,4'-diamine, 1 part of a polycarbonate resin ("Lexan 145" produced by General Electric Co.; molecular weight: from 35,000 to 40,000), and 15 parts of dichloromethane was then coated on the charge generating layer by means of an applicator and dried to form a charge transport layer having a dry thickness of 20 μm.

The thus produced electrophotographic photoreceptor was evaluated for performance characteristics by means of an electrostatic copying paper testing apparatus ("SP-428" manufactured by Kawaguchi Denki Seisakusho) as follows. The photoreceptor was negatively charged to −6 KV by corona discharge and allowed to stand in a dark place for 2 seconds. The surface potential Vpo (volt) at this point was measured. Thereafter, the photoreceptor was exposed to light of a tungsten lamp at an illuminance of 5 lux, and the time required for the surface potential to decrease to a half of Vpo was measured to calculate an exposure amount $E_{\frac{1}{2}}$ (lux.sec). These measurements were repeated 20 times. The results obtained in the first and 20th measurements are shown in Table 1 below.

TABLE 1

|  | 1st Measurement | 20th Measurement |
| --- | --- | --- |
| Vpo (volt) | −825 | −815 |
| $E_{\frac{1}{2}}$ (lux.sec) | 2.1 | 2.1 |

COMPARATIVE EXAMPLES 1 AND 2

An electrophotographic photoreceptor was produced in the same manner as in Reference Example 2, except that Comparative Compound No. 1 or 2 shown below was used in place of the bisazo compound of formula (I-1), and performance characteristics of the resulting photoreceptors were evaluated in the same manner as in Reference Example 2. The results obtained are shown in Table 2 below.

Comparative Compound No. 1

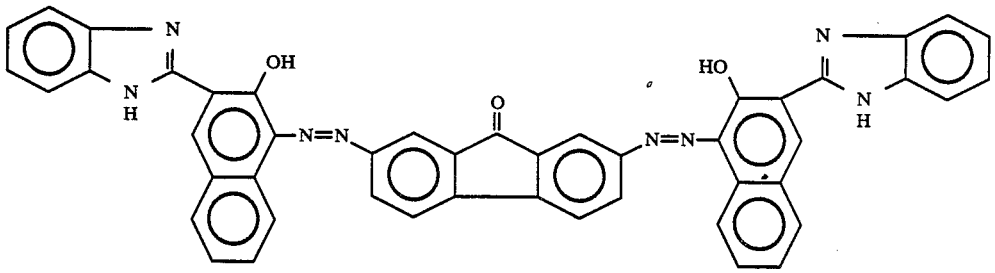

(described in Japanese Patent Application (OPI) No. 189759/85)

Comparative Compound No. 2

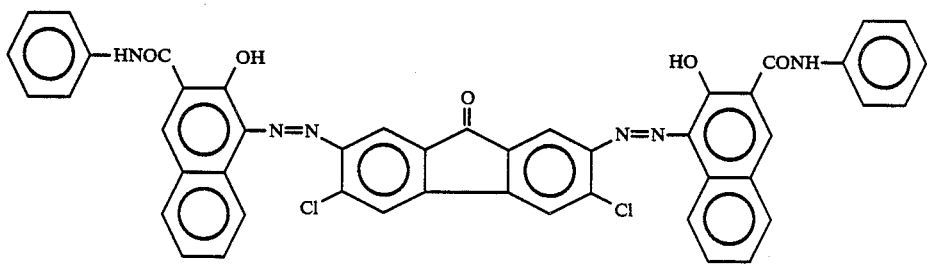

(described in Japanese Patent Application (OPI) Nos. 129653/86 and 221751/86)

TABLE 2

| Comparative Example No. | 1st Measurement | | 20th Measurement | |
| --- | --- | --- | --- | --- |
|  | Vpo (volt) | $E_{\frac{1}{2}}$ (lux.sec) | Vpo (volt) | $E_{\frac{1}{2}}$ (lux.sec) |
| 1 | −755 | 6.3 | −720 | 6.2 |
| 2 | −850 | 4.2 | −810 | 4.1 |

It can be seen from the results of the foregoing Reference Example 2 and Comparative Examples 1 and 2 that the bisazo compounds of formula (I) according to the present invention show excellent electrophotographic characteristics as compared with the conventionally proposed azo pigments.

While the invention has been described in detail and with reference to specific embodiments thereof, it will be apparent to one skilled in the art that various changes and modifications can be made therein without departing from the spirit and scope thereof.

What is claimed is:

1. A bisazo compound of the formula

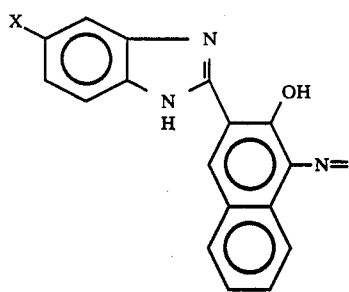
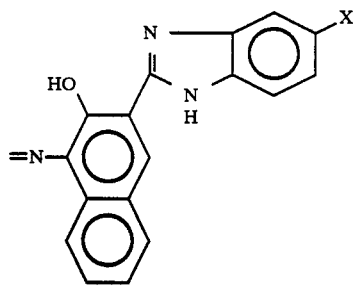
wherein X represents —H, —Cl or NO₂.
2. A bisazo compound as claimed in claim 1, wherein X is —H.
3. A bisazo compound as claimed in claim 1, wherein X is —Cl.
4. A bisazo compound as claimed in claim 1, wherein X is —NO₂.
* * * * *